US005289623A

United States Patent [19]

Ohtsubo

[11] Patent Number: 5,289,623

[45] Date of Patent: Mar. 1, 1994

[54] SHIM ATTACHING/DETACHING TOOL FOR ENGINE TAPPET

[75] Inventor: Kizuku Ohtsubo, Fujisawa, Japan

[73] Assignee: Fuji Oozx Inc., Fujisawa, Japan

[21] Appl. No.: 38,233

[22] Filed: Mar. 26, 1993

[30] Foreign Application Priority Data

May 28, 1992 [JP] Japan ............................ 4-042189[U]

[51] Int. Cl.[5] ............................................. B23P 19/04

[52] U.S. Cl. .................................... 29/213.1; 29/239; 29/252; 239/597

[58] Field of Search ...................... 239/597, 592, 595; 425/461; 137/801; 261/DIG. 39; 29/213.1, 239, 252

[56] References Cited

U.S. PATENT DOCUMENTS

| | | | |
|---|---|---|---|
| 1,898,720 | 2/1933 | Elder | 29/252 |
| 2,130,173 | 9/1938 | Barnes | 239/595 |
| 4,026,001 | 5/1977 | Jones | 29/252 |
| 4,141,507 | 2/1979 | Rump | 239/592 |
| 4,787,130 | 11/1988 | Hall et al. | 29/252 |

FOREIGN PATENT DOCUMENTS

| | | | |
|---|---|---|---|
| 648346 | 7/1937 | Fed. Rep. of Germany | 239/597 |
| 717474 | 2/1942 | Fed. Rep. of Germany | 239/592 |
| 56-152808 | 11/1981 | Japan . | |
| 58-45904 | 3/1983 | Japan . | |
| 58-48905 | 4/1983 | Japan . | |
| 58-67904 | 5/1983 | Japan . | |
| 58-67905 | 5/1983 | Japan . | |
| 58-67906 | 5/1983 | Japan . | |

*Primary Examiner*—Robert C. Watson
*Attorney, Agent, or Firm*—Zarley, McKee, Thomte, Voorhees & Sease

[57] ABSTRACT

A shim attaching/detaching tool for a tappet of an internal combustion engine includes as essential components an air supplying tube, an air blowing tube and a nozzle formed at an opening portion of the air blowing tube at the foremost end of the same. When compressed air is blown from the nozzle toward the shim while the air supplying tube is inclined at an angle of about 45 degrees and the nozzle is oriented toward the fitting portion of the shim fitted into a circular cavity, the shim is thrusted against the opposite side of the cavity and the compressed air is then introduced into the space below the shim through the gap appearing around the fitting portion of the shim, whereby the shim is floated up away from the cavity so as to enable it to be easily exchanged with another shim having a different thickness.

7 Claims, 4 Drawing Sheets

SHIM ATTACHING/DETACHING TOOL FOR ENGINE TAPPET

BACKGROUND OF THE INVENTION

1. Field of the Invention

The present invention relates generally to a shim attaching/detaching tool for a tappet of an internal combustion engine. More particularly, the present invention relates to a shim attaching/detaching tool for properly adjusting a valve clearance for a tappet arranged in a direct-acting type valve driving mechanism for an internal combustion engine.

2. Description of the Related Art

To facilitate understanding of the present invention, a direct-acting type valve driving mechanism hitherto employed mainly for a DOHC type engine will be described below.

FIG. 7 is a fragmentary sectional view which schematically shows the structure of a direct-acting type valve driving mechanism. The valve driving mechanism includes an engine valve 101 of which valve section is not shown in the drawing and which is fitted into a cylinder head 105. In addition, a pair of cotters 102, a spring retainer 103 and a valve spring 104 are arranged for the engine valve 101.

As shown in the drawing, a cylindrical tappet 106 of which upper surface is closed with an upper wall 107 is inserted through the cylinder head 105 from above while the bottom surface of the upper wall 107 comes in contact with the uppermost end of the engine valve 101.

The upper wall 107 of the cylindrical tappet 106 includes an annular side wall 108 which serves to define a circular cavity 109 so as to allow a shim 110 for adjusting a valve clearance to be fitted thereinto.

The engine valve 101 is adapted to open and close as the tappet 106 is vertically displaced by a rotary cam 111 which is normally brought in contact with the upper surface of the shim 110.

With the direct-acting type valve driving mechanism constructed in the above-described manner, adjustment of the valve clearance is achieved by exchanging the shim 110 with another one having a different thickness while the tappet 106 is depressed by actuating a certain jig (not shown). However, since a quantity of projection of the shim 110 above the upper end of the tappet 106 is small, a gap around the fitting portion of the shim 110 is minimized as far as possible, and moreover, the shim 110 comes in close contact with the upper surface of the upper wall 107 while a film of lubricant is interposed therebetween, it is very difficult to detach the shim 110 from the tappet 106.

To cope with the foregoing difficulty, proposals have been made with respect to tappets as shown in FIG. 8 and FIG. 9.

In the case of a tappet 106 shown in FIG. 8, a pair of slit-shaped cutouts 112 are diametrically formed on an annular side wall 108 which projects above an upper wall 107 of the tappet 106. When a shim 110 is exchanged with another one having a different thickness, a tool such as a driver or the like is inserted into each cutout 112 so as to detach the shim 110 from the circular cavity on the upper wall 107 of the tappet 106.

In case of the tappet 106 shown in FIG. 9, an aperture 113 is axially formed through a shim 113 so that a rod-shaped detaching jig (not shown) is inserted into the aperture 113 so as to allow the shim 113 to be raised up away from an upper wall 107 of the tappet 106 to exchange the shim 110 with another one having a different thickness or a compressed air is blown through the aperture 113 so as to allow the shim 110 to be floated up away from an upper wall 107 to exchange the shim 110 with another one.

In recent years, there is recognized a general tendency that tappets each made of a light metallic material such as aluminum alloy or the like are substituted for those made of a ferrous metallic material such as cast iron or the like for the purpose of designing a valve driving system with smaller weight.

Since a tappet made of a light metallic material is inferior to that made of a ferrous metallic material in respect of strength and rigidity, there arises a malfunction that the valve driving system incorrectly operates due to the diametrical formation of the cutouts 112 on the side wall 108 as shown in FIG. 8 during rotation of the engine at a high speed. Thus, when the side wall 108 is loaded with a large magnitude of repeated load effective in the outward direction, there is a possibility that the side wall 108 is damaged or broken due to the crack caused by the stress concentrated on each cutout 112. It should be added that the number of machining steps increases corresponding to the formation of the cutouts 112, resulting in the tappet 106 being produced at an increased cost.

On the other hand, in case of the tappet shown in FIG. 9, the number of machining steps likewise increases corresponding to the formation of the aperture 113 through the shim 110, resulting in the tappet 106 being disadvantageously produced at a high cost. The shim 110 is caused to rotate in a certain direction by the action of a force effective at a right angle relative to the axis line during rotation of the rotary cam 111. Thus, the face pressure appearing on a slidable contact face between the shim 110 and the rotary cam 111 intermittently varies every time the nose face of the rotary cam 111 is brought in contact with the aperture 113, moreover, the face pressure is raised up to be higher than that in the surrounding region.

Consequently, local wear occurs not only in the surrounding region of the aperture 113 on the upper surface of the shim 110 but also on the nose face of the rotary cam 111, resulting in durability of the tappet 106 being degraded.

SUMMARY OF THE INVENTION

The present invention has been made in consideration of the foregoing background.

An object of the present invention is to provide a shim attaching/detaching tool for a tappet of an internal combustion engine wherein a shim can easily be detached from the tappet without any particular necessity for machining a main body of the tappet and the shim for the purpose of shim detachment.

Another object of the present invention is to provide a shim attachment/detachment tool for a tappet of an internal combustion engine wherein the present shim can easily be exchanged with another shim having a different thickness immediately after it is detached from the tappet.

The present invention provides a shim attaching-/detaching tool for a tappet of an internal combustion engine wherein an annular side wall stands upright from the upper end of a cylindrical body of the tappet of which upper surface is closed with an upper wall and a shim is detachably received in a circular cavity defined by the annular side wall to adjust a valve clearance as desired, wherein the shim attaching/detaching tool comprises an air supplying tube having a predetermined length and communicated with a compressed air supply source, an air blowing tube integrally connected to said air supplying tube, and a flat nozzle formed at an opening portion of the air blowing tube at the foremost end of the same, a largest height of the flat nozzle being dimensioned so as not to exceed a height of the shim projected above the upper end face of the annular side wall when the opening portion of the air blowing tube is brought in contact with the fitting portion of the shim fitted into the cavity.

To assure that compressed air is concentratively blown toward the fitting portion of the shim with a minimum quantity of air leakage, upper and lower edges of the opening portion of the opening portion at the foremost end of the air blowing tube are designed to have the substantially same radius of curvature as that of the shim.

For the same purpose as mentioned above, substantially right-angled projections are formed on the opposite sides of the nozzle while extending in the forward direction.

It is desirable from the viewpoint of practical use that a locating member comprising a stopper piece and a wedge piece is fixedly secured to the fore end part of the air blowing tube. The stopper piece serves to allow the nozzle to be spaced away from the shim when the lower end face of the air blowing tube comes in contact with the upper end face of the annular side wall. On the other hand, the wedge piece serves to define an inclination angle of the nozzle relative to the shim when the lower end face of the air blowing tube comes in contact with the upper end face of the annular side wall.

To assure that the present shim is easily exchanged with another one having a different thickness, it is recommendable that a pair of flexible support pieces are fixedly secured to the opposite side faces of the air blowing tube. In this case, the support pieces are designed such that when they are held in the inoperative free state, they are located at the positions within the circular cavity, while when the nozzle is oriented toward the fitting portion of the shim, they are brought in pressure contact with the outer peripheral surface of the shim.

With the shim attaching/detaching tool constructed in the above described manner, when compressed air is blown toward the fitting portion of the shim from the flat nozzle while the air supplying tube is inclined at an angle of about 45 degrees, the shim is thrusted against the opposite side of the annular side wall to the nozzle by the action of pressure of the compressed air, and the compressed air is then introduced into the space below the lower surface of the shim, causing the shim to be floated up away from the cavity. Now, the shim is ready to be exchanged with another shim having a different thickness.

Other objects, features and advantages of the present invention will become apparent from reading of the following description which has been made in conjunction with the accompanying drawings.

BRIEF DESCRIPTION OF THE DRAWINGS

The present invention is illustrated in the following drawings in which.

DESCRIPTION OF THE PREFERRED EMBODIMENTS

The present invention will now be described in detail hereinafter with reference to the accompanying drawings which illustrate a few preferred embodiments thereof.

Figure 1:
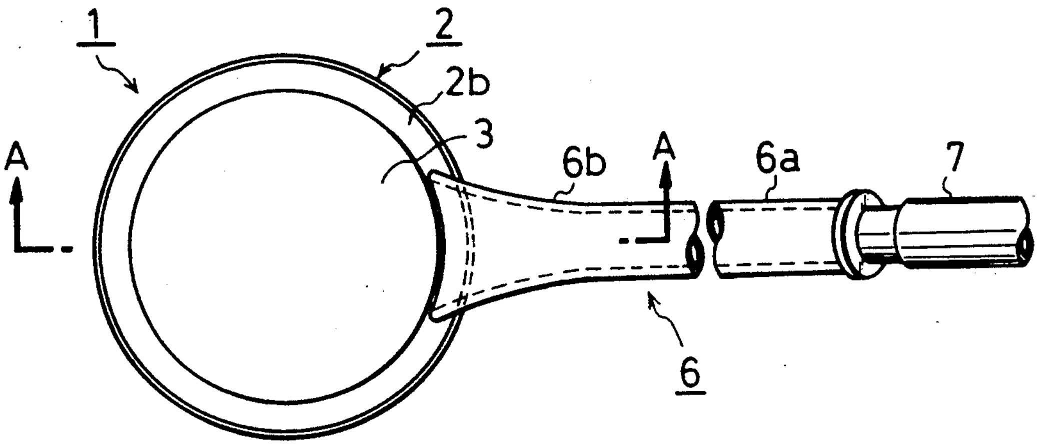
FIG. 1 is a plan view of a shim attaching/detaching tool constructed according to a first embodiment of the present invention, particularly showing by way of example how the shim attaching/detaching tool is practically used.
Figure 2:
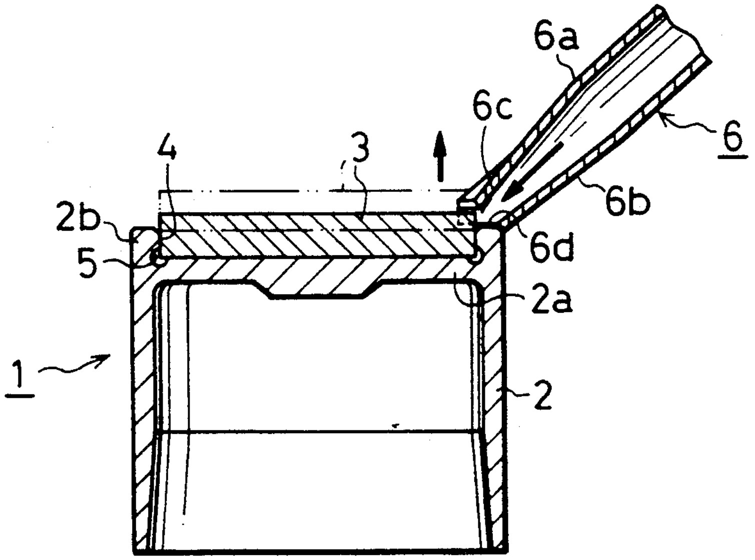
FIG. 2 is a vertical sectional view of the shim attaching/detaching tool taken along line A—A in FIG. 1.
Figure 3:
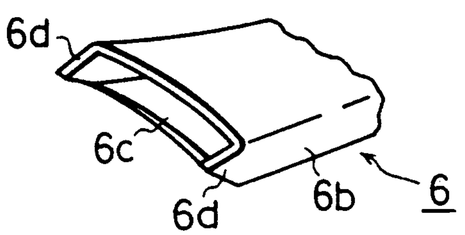
FIG. 3 is an enlarged perspective view of an air blowing tube of the shim attaching/detaching tool.

FIG. 1 to FIG. 3 show a shim attaching/detaching tool for a tappet of an internal combustion engine constructed according to a first embodiment of the present invention.

As shown in FIG. 1 and FIG. 2, a tappet 1 is composed of a cylindrical body 2 made of a light metallic material such as aluminum alloy or the like and a circular disc-shaped shim 3 made of a wear resistant metallic material such as grey cast iron, chromium-molybdenum alloy steel or the like. The shim 3 is detachably fitted into a cavity 4 defined by an annular side wall *2b* standing upright from the upper surface of an upper wall *2a* of the body 2.

A fitting portion of the shim 3, i.e., an annular gap between an outer peripheral surface of the shim 3 and an inner peripheral surface of the side wall *2b* is dimensioned to have a maximum value of about 0.05 mm.

In FIG. 2, reference numeral 5 designates an annular relief groove which is recessed around a corner of the cavity 4 defined by the side wall *2b*.

In the drawings, reference numeral 6 designates a shim attaching/detaching tool of the present invention. In detail, the shim attaching/detaching tool 6 is composed of an air supplying tube *6a* and an air blowing tube *6b* constituting the fore end part of the air supplying tube *6a*. As is best seen in FIG. 2, the air blowing tube *6b* is flatly squeezed in the vertical direction in such a manner that a thickness of the air blowing tube 6b is gradually reduced toward the foremost end of the air supplying tube 6a.

Each of upper and lower edges of the air blowing tube 6b at the foremost end of the latter exhibits an arc-shaped contour having the same radius of curvature as that of the shim 3 and the body 2 of the tappet 1, and an opening portion of the air blowing tube 6b is designed in the form of a flat rectangular nozzle 6c (see FIG. 3). Substantially right-angled triangular projections 6d are formed at the opposite ends of the nozzle 6c.

it should be noted that a largest height of the nozzle 6c is dimensioned such that the lower end of the nozzle 6c is flush with the upper end of the shim 3 or slightly lowered from the same.

When the shim 3 is detached from the tappet 1 by using the attaching/detaching tool 6 constructed according the first embodiment of the present invention, an air hose 7 communicated with a compressed air supply source (not shown) is preliminarily connected to the rearmost end of the air supplying tube 6a. While the foregoing state is maintained, the attaching/detaching tool 6 is inclined at an angle of about 45 degrees such that the foremost end of the air blowing tube 6b is oriented toward the fitting corner portion of the shim 3, and thereafter, the attaching/detaching tool 6 is held with an operator's hand such that the upper and lower fore edges of the nozzle 6c are brought in contact with the upper end of the shim 3 as well as the peripheral edge of the side wall 2b. At this time, the triangular gaps formed between the opposite ends of the nozzle 6c and the fitting corner portion of the shim 3 are substantially closed with the projections 6d outwardly extending from the opposite ends of the nozzle 6c.

Subsequently, when compressed air is supplied from the nozzle 6c via the air hose 7, the shim 3 is thrusted against the inner wall surface of the side wall 2b located opposite to the nozzle 6c by the action of pressure of the compressed air blown toward the projected part of the shim 3, and at the same time, the air which has entered through the gap appearing along the fitting portion of the shim 3 is quickly introduced into the cavity between the upper surface of the upper wall 2a and the lower surface of the shim 3, whereby the shim 3 is forcibly floated up by the action of the air pressure.

As is apparent from the above description, according to the first embodiment of the present invention, since the air blowing tube 6b is flatly squeezed so as to allow the nozzle 6c located at the opening portion of the air blowing tube 6b to exhibit a rectangular contour, the compressed air is concentratively blown toward the projected part of the shim 3 from the nozzle 6c so that the shim 3 is easily thrusted against the opposite side of the side wall 2b to the nozzle 6c, causing the compressed air to be effectively introduced in the space below the lower surface of the shim 3 through the gap appearing along the fitting portion of the shim 3. In addition, since the gaps formed on the opposite sides of the nozzle 6c are closed with the projections 6d with a minimized quantity of compressed air leaking therefrom, the air pressure is effectively exerted on the peripheral surface of the shim 3, whereby the shim 3 is easily floated up away from the upper surface of the upper wall 2a with an increased quantity of compressed air introduced into the space below the lower surface of the shim 3.

Figure 4:
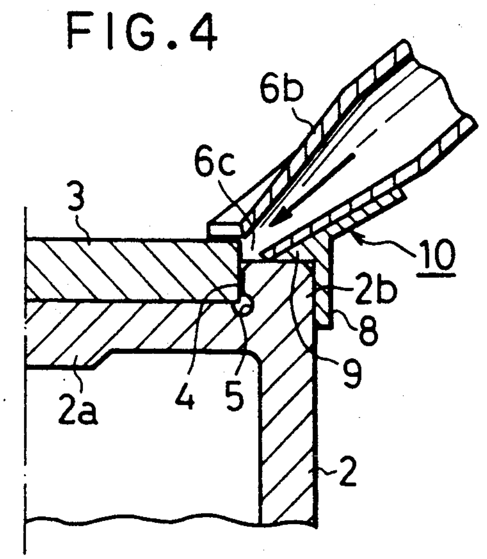
FIG. 4 is an enlarged fragmentary vertical sectional view of a shim attaching/detaching tool constructed according to a second embodiment of the present invention, particularly showing by way of example how the shim attaching/detaching tool is practically used.

Next, a shim attaching/detaching tool constructed according to a second embodiment of the present invention will be described below with reference to FIG. 4. In this embodiment, a locating member 10 is fixedly secured to a flat air blowing tube 6b of the attaching-/detaching tool and includes a downwardly extending stopper piece 8 and a nozzle piece 9. In detail, the stopper piece 8 serves to allow the nozzle 6c to be spaced away from the outer peripheral edge of the shim 3 without any direct contact with the shim 3 while the lower end face of the air blowing tube 6b comes in contact with the upper end face of the side wall 2b. On the other hand, the wedge piece 9 serves to define an inclination angle of the air blowing tube 6b relative to the fitting portion of the shim 3 fitted into the cavity, i.e., a blowing angle of compressed air from the nozzle 6c while the lower face of the air blowing tube 6b at the foremost end of the same comes in contact with the upper face of the side wall 2b.

With the attaching/detaching tool constructed according to the second embodiment of the present invention, since not only the distance between the nozzle 6c and the shim 3 but also the angle of the nozzle 6c relative to the shim 3 are always kept constant without any fluctuation from operator to operator, the shim 3 can simply be detached away from the upper surface of the upper wall 2a by any operator so as to enable it to be exchanged with another shim having a different thickness.

Figure 5:
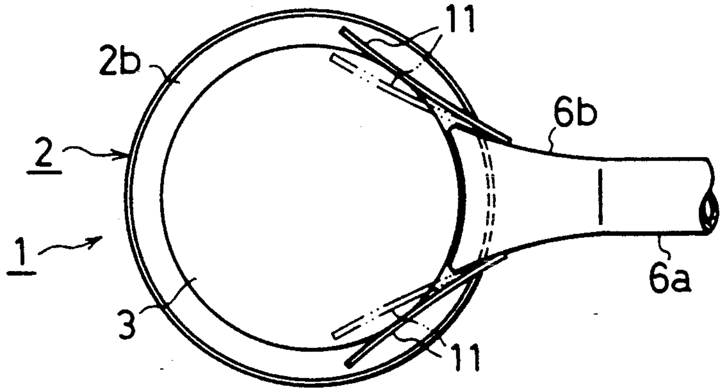
FIG. 5 is a plan view of a shim attaching/detaching tool constructed according to a third embodiment of the present invention, particularly showing by way of example how the shim attaching/detaching tool is practically used.
Figure 6:
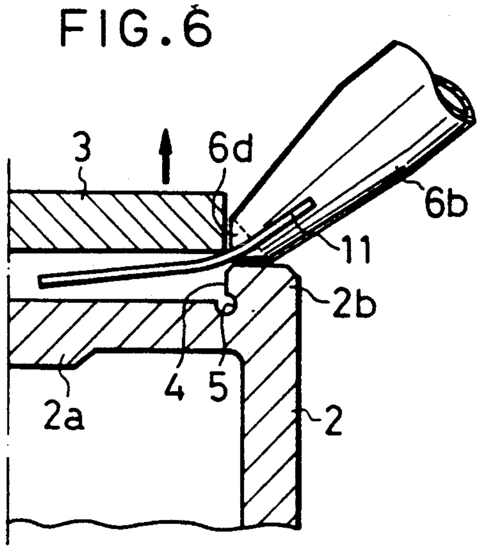
FIG. 6 is an enlarged fragmentary vertical sectional view of the shim attaching/detaching tool, particularly showing that a support piece is brought in a circular cavity below the lower surface of a shim.
Figure 7:
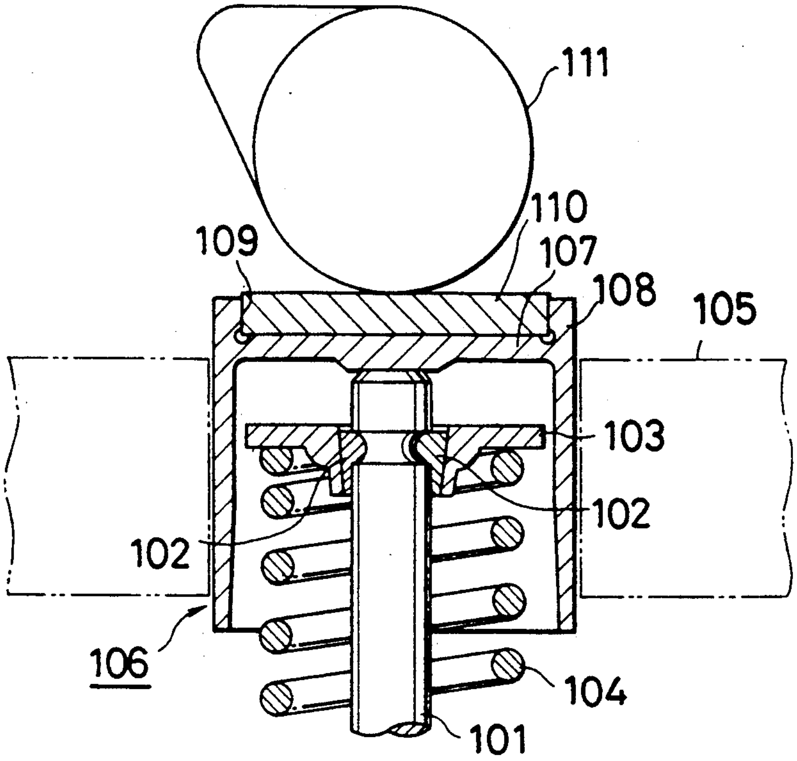
FIG. 7 is a vertical sectional view of a direct-acting type valve driving mechanism to which the present invention is applied.
Figure 8:
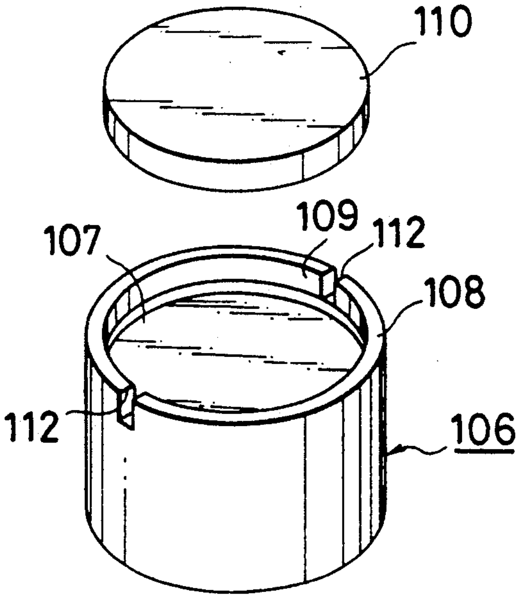
FIG. 8 is a perspective view which shows a tappet and a shim in the disassembled state wherein conventional shim detaching means, i.e., slit-shaped cutouts are formed on the tappet.
Figure 9:
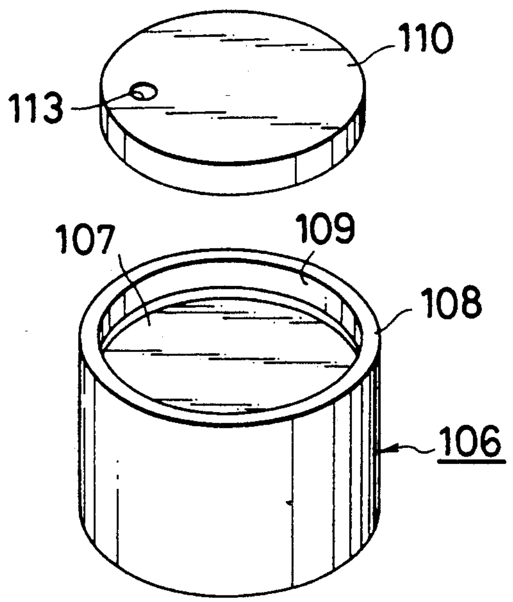
FIG. 9 is a perspective view which shows a tappet and a shim in the disassembled state wherein another conventional shim detaching means, i.e., an aperture is formed through the shim.

Next, a shim attaching/detaching tool constructed according to a third embodiment of the present invention will be described below with reference to FIG. 5 and FIG. 6. A pair of flexible support pieces 11 each exhibiting a low intensity of resilient force are fixedly secured to the opposite side faces of the air blowing tube 6b at the fore end part of the latter. While the support pieces 11 are held in the inoperative free state, they are located in the cavity 4 defined by the side wall 2b as represented by phantom lines in FIG. 5 while exhibiting a substantially V-shaped contour as seen from above.

In this embodiment, when compressed air is blown from the nozzle 6c toward the fitted portion of the shim 3 around the corner defined by the upper face of the side wall 2b while both the support pieces 11 are brought in pressure contact with the outer peripheral surface of the shim 3, the shim 3 is floated up away from the upper surface of the upper wall 2a, and at the same time, they are displaced into the cavity 4 by the action of their restorative resilience force so as to support the shim 3 therewith from below. Thus, there is no possibility that the shim 3 is received in the cavity 4 again when supplying of the compressed air is stopped.

Although illustration is neglected for the purpose of simplification in each of the aforementioned embodiments, a stop valve may be disposed at the intermediate position of the air supplying tube 6a so as to allow supplying and stopping of the compressed air to be manually achieved with an operator's hand.

While the present invention has been described above with respect to three preferred embodiments thereof, it should of course be understood that the present invention should not be limited only to these embodiments but various change or modification may be made without departure from the scope of the present invention as defined by the appended claims.

What is claimed is:

1. A shim attaching/detaching tool for a tappet of an internal combustion engine wherein an annular side wall stands upright from the upper end of a cylindrical body of said tappet which upper surface is closed with an upper wall and a shim is detachably received in a circular cavity defined by said annular side wall to adjust a valve clearance as desired, comprising:

an air supplying tube having a predetermined length and communicated with a compressed air supply source, an air blowing tube integrally connected to said air supplying tube, a flat nozzle formed at an opening portion of said air blowing tube at the foremost end of the same, a largest height of said flat nozzle being dimensioned so as not to exceed a height of said shim projected above the upper end face of said annular side wall when said opening portion of said air blowing tube is brought in contact with the fitting portion of said shim fitted into said circular cavity right-angled projections being formed on the opposite sides of said nozzle while extending in the forward direction.

2. The shim attaching/detaching tool according to claim 1, wherein upper and lower edges of said opening portion at the foremost end of said air blowing tube are dimensioned to have the substantially same radius of curvature as that of said shim.

3. The shim attaching/detaching tool according to claim 1 wherein a locating member comprising a stopper piece and a wedge piece is fixedly secured to the fore end part of said air blowing tube, said stopper piece serving to allow said nozzle to be spaced away from said shim while the lower end face of said air blowing tube comes in contact with the upper end face of said annular side wall, and said wedge piece serving to define an inclination angle of said nozzle relative to said shim while the lower end face of said air blowing tube comes in contact with the upper end face of said annular side wall.

4. The shim attaching/detaching tool according to claim 1 wherein a pair of flexible support pieces are fixedly secured to the opposite side faces of said air blowing tube, said support pieces being designed such that when they are held in the inoperative free state, they are located at the positions within said circular cavity, while when said nozzle is oriented toward the fitting portion of said shim, they are brought in pressure contact with the outer peripheral surface of said shim.

5. A shim attaching/detaching tool for a tappet of an internal combustion engine wherein an annular side wall stands upright from the upper end of a cylindrical body of said tappet which upper surface is closed with an upper wall and a shim is detachably received in a circular cavity defined by said annular side wall to adjust a valve clearance as desired, comprising:

an air supplying tube having a predetermined length and communicated with a compressed air supply source, an air supplying tube integrally connected to said air supplying tube, and a flat nozzle formed at an opening portion of said air blowing tube at the foremost end of the same, upper and lower edges of said opening portion at the foremost end of said air blowing tube being dimensioned to have the substantially same radius of curvature as that of said shim, substantially right-angled projections being formed on the opposite sides of said nozzle while extending in the forward direction, a largest height of said flat nozzle being dimensioned so as not to exceed a height of said shim projected above the upper and face of said annular side wall when said opening portion of said air blowing tube is brought in contact with the fitting portion of said shim fitted into said circular cavity, thereby forming closed space between the opening portion of said air blowing tube, the annular side wall and the shim.

6. The shim attaching/detaching tool according to claim 5, wherein a locating member comprising a stopper piece and a wedge piece is fixedly secured to the fore end part of said air blowing tube, said stopper piece serving to allow said nozzle to be spaced away from said shim while the lower end face of said air blowing tube comes in contact with the upper and face of said annular side wall, and said wedge piece serving to define an inclination angle of said nozzle relative to said shim while the lower end face of said air blowing tube comes in contact with the upper end face of said annular side wall.

7. The shim attaching/detaching tool according to claim 6, wherein a pair of flexible support pieces are fixedly secured to the opposite side faces of said air blowing tube, said support pieces being designed such that when they are held in the inoperative free state, they are located at the positions within said circular cavity, while when said nozzle is oriented toward the fitting portion of said shim, they are brought in pressure contact with the outer peripheral surface of said shim.

* * * * *